US008989465B2

(12) United States Patent
Trzasko et al.

(10) Patent No.: US 8,989,465 B2
(45) Date of Patent: Mar. 24, 2015

(54) SYSTEM AND METHOD FOR MEDICAL IMAGE RECONSTRUCTION AND IMAGE SERIES DENOISING USING LOCAL LOW RANK PROMOTION

(71) Applicants: Joshua D. Trzasko, Rochester, MN (US); Armando Manduca, Rochester, MN (US)

(72) Inventors: Joshua D. Trzasko, Rochester, MN (US); Armando Manduca, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 122 days.

(21) Appl. No.: 13/743,465

(22) Filed: Jan. 17, 2013

(65) Prior Publication Data

US 2013/0182930 A1    Jul. 18, 2013

Related U.S. Application Data

(60) Provisional application No. 61/587,449, filed on Jan. 17, 2012.

(51) Int. Cl.
*G06K 9/00* (2006.01)
*G06T 11/00* (2006.01)
(52) U.S. Cl.
CPC ............. *G06T 11/003* (2013.01); *G06T 11/006* (2013.01); *G06T 2211/412* (2013.01); *G06T 2211/424* (2013.01)
USPC ......................................................... 382/128

(58) Field of Classification Search
CPC ...... A61B 8/463; A61B 1/005; A61B 5/0073; G06T 2207/10132; G06T 11/003; G06T 2207/20021
USPC ........................................... 382/128; 250/455
See application file for complete search history.

(56) References Cited

U.S. PATENT DOCUMENTS

| 2005/0220265 A1* | 10/2005 | Besson ........................... 378/16 |
| 2009/0252682 A1* | 10/2009 | Hillman ......................... 424/9.1 |
| 2012/0099774 A1* | 4/2012 | Akcakaya et al. ............. 382/131 |
| 2013/0170609 A1* | 7/2013 | Nett et al. ......................... 378/4 |

OTHER PUBLICATIONS

Nion, Adaptive Algorithms to Track the PARAFAC Decomposition of a Third-Order Tensor, Jun. 2009,IEEE Transactions on Signal Processing, vol. 57, No. 6.*
Bydder, et al., Noise Reduction in Multiple-Echo Data Sets Using Singular Value Decomposition, Magnetic Resonance Imaging, 2006, 24:849-856.
Cai, et al., A Singular Value Thresholding Algorithm for Matrix Completion, SIAM Journal on Optimization, 2010, 20 (4):1956-1982.

(Continued)

*Primary Examiner* — Amir Alavi
*Assistant Examiner* — Kenny Cese
(74) *Attorney, Agent, or Firm* — Quarles & Brady, LLP

(57) ABSTRACT

A method for reconstructing a time series of images from data acquired with a medical imaging system is provided. Data is acquired with the medical imaging system, and a set of image blocks that defines the location and size of each of a plurality of image blocks in the image domain is then selected. The acquired data and selected image block set are then used to jointly estimate a plurality of images that form a time series of images while promoting locally-low rank structure in the images.

29 Claims, 5 Drawing Sheets

(56) References Cited

OTHER PUBLICATIONS

Haldar, et al., Spatiotemporal Imaging with Partially Separable Functions: A Matrix Recovery Approach, 2010 IEEE International Symposium on Biomedical Imaging: From Nano to Macro, pp. 716-719.

Liang, Spatiotemporal Imaging with Partially Separable Functions, ISBI 2007, 4th IEEE International Symposium on Biomedical Imaging: From Nano to Macro, pp. 988-991.

Lingala, et al., Accelerated Dynamic MRI Exploiting Sparsity and Low-Rank Structure: k-t SLR, IEEE Transactions on Medical Imaging, 2011, 30(5):1042-1054.

Olsson, et al., A Convex Approach to Low Rank Matrix Approximation with Missing Data, In Image Analysis, pp. 301-309, Springer Berlin Heidelberg, 2009.

Zhao, et al., Low Rank Matrix Recovery for Real-Time Cardiac MRI, 2010 IEEE International Symposium on Biomedical Imaging: From Nano to Macro, pp. 996-999.

* cited by examiner

SYSTEM AND METHOD FOR MEDICAL IMAGE RECONSTRUCTION AND IMAGE SERIES DENOISING USING LOCAL LOW RANK PROMOTION

CROSS REFERENCE

The present invention is based on, claims priority to, and incorporated herein by reference in its entirety, U.S. Provisional Application Ser. No. 61/587,449, filed Jan. 17, 2012, and entitled "Method for Medical Image Reconstruction and Image Series Denoising Using Locally Low Rank Matrix Promotion."

BACKGROUND OF THE INVENTION

The present invention relates to systems and methods for medical imaging. More particularly, the invention relates to systems and methods for reconstructing medical images.

Dynamic imaging, such as dynamic magnetic resonance imaging ("MRI") or computed tomography ("CT") is based on the repeated scanning of some anatomy to observe morphological, functional, or parametric changes. Simultaneously achieving high spatial, temporal, parametric, and contrast resolution is a main challenge faced in all dynamic imaging applications.

Contemporary dynamic imaging protocols combine undersampled acquisitions with reconstruction models that specifically exploit the highly redundant spatiotemporal structure of the dynamic imaging data. For example, periodic cardiac motion can be efficiently modeled in the temporal Fourier domain.

Recent works have suggested that high-quality dynamic MRI reconstructions can be achieved by promoting low-rank ("LR") structure in the estimated series globally. With such techniques, aggressive rank reduction will result in temporal blurring, while only modest rank reduction will fail to adequately remove spatial blurring. Promoting low-rank structure during dynamic MRI series reconstruction has strong practical and theoretical appeal, but the disproportionality in size between the spatial and temporal, or parametric, dimensions of most dynamic MRI data series inhibits the practical utilization of the standard global approach.

Therefore, it would be desirable to have a system and method for reconstructing and processing dynamic or time-series images to provide greater image quality, such as having lower over all noise, without adversely reducing clinically-useful information within the images.

SUMMARY OF THE INVENTION

The present invention overcomes the aforementioned drawbacks by providing a system and method for jointly estimating a time series of images while promoting locally low-rank structure in the reconstructed images.

In accordance with one aspect of the invention, a method is provided for creating a time series of images. In the method, data is acquired from the subject during a period of time. A set of image blocks that defines the location and size of each of a plurality of image blocks in the image domain is then selected and used along with the acquired data to produce a time series of images of the subject. Each of the images in the time series is jointly estimated in a manner that promotes locally low-rank structure in the images. By way of example, the joint estimation of the time series of images includes minimizing an objective function while promoting locally low-rank structure in the jointly estimated images. For example, locally low-rank structure may be promoted by imposing a penalty factor that penalizes non-locally low-rank structure. By way of example, such a penalty factor may include the calculation of a singular value soft-threshold for each image block.

In accordance with another aspect of the invention, a medical imaging system is disclosed that includes a system for collecting image domain data from a subject over a time period to assemble time series image domain data. The system also includes a processor configured to reconstruct the time series image domain data into a time series of images of the subject over the time period by selecting a set of image blocks that defines a location and size of each of a plurality of image blocks in the time series image domain data. The processor is also configured to jointly estimating each of a plurality of images that form the time series of images of the subject using the time series image domain data and the set of image blocks.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
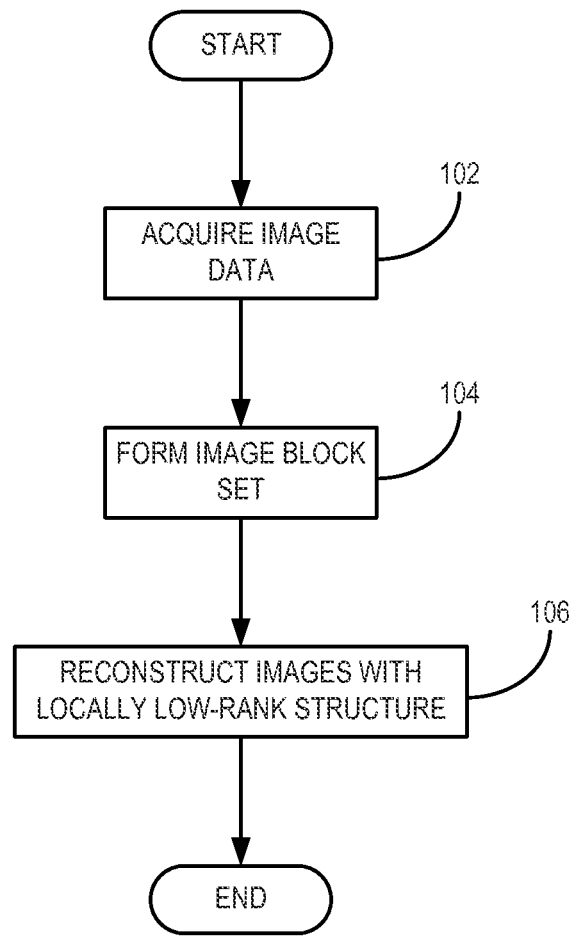
FIG. 1 is a flowchart setting forth the steps of an example of a method for reconstructing a dynamic series of images by promoting locally low-rank structure during image reconstruction.

The present invention provides a system and method for image reconstruction that promotes locally low rank ("LLR") structure. Such an image reconstruction technique is amenable for improving the spatial and temporal reconstruction fidelity of dynamic medical imaging series, such as dynamic magnetic resonance imaging ("MRI") series, computed tomography ("CT") series, single photon emission computed tomography ("SPECT") imaging series, positron emission tomography ("PET") imaging series, ultrasound imaging series, and the like. With the method of the present invention, an image series may be reconstructed from only a subset of the data normally required to form the image series, and, correspondingly, the image acquisition time may be reduced. A method for denoising series data based on the promotion of locally low-rank structure is also provided.

In dynamic time series imaging, noise varies from image to image, but a majority of the underlying structure is generally preserved. Techniques that take advantage of this are capable of efficiently recovering such data sets when only an incomplete set of measurements is available, or removing noise from the set of images even when a complete set of measurements is available. Without loss of generality, the succeeding systems and methods are described with respect to two-dimensional applications. However, the extension of these systems and methods to higher dimensions, such as three dimensions, is straightforward and requires no auxiliary mathematical or technical development. For higher-dimensional applications, such as three-dimensional MRI, the entire volume-of-interest may be processed at once using the proposed techniques or, in certain situations like Cartesian imaging, the reconstruction process may be decomposed into a collection of separable, lower-dimensional problems. By way of example, for three-dimensional Cartesian MRI acquisitions, where the frequency-encoded readout dimension is typically fully sampled, the target volume may be decomposed into a series of two-dimensional slices, each of which corresponds to a single phase-encoded plane. Each two-dimensional plane may then be processed independently. This option may offer computational advantages, albeit at an expense in reconstruction performance. By way of example, for three-dimensional Cartesian applications in which only a partial readout is employed, standard partial Fourier methods may be used to facilitate the decomposition of the three-dimensional problem into a series of two-dimensional reconstruction problems.

Generally, the present invention approaches image reconstruction or data processing by partitioning a time-series of data into small spatial blocks and then rearranging those blocks into matrices whose axes correspond with space and time, respectively. A singular value decomposition (SVD) of each of these matrices can be computed, thresholding away small singular values, which promotes low-rank structure and averaging the resulting blocks. In doing so, significant undersampling artifact removal and denoising performance is achievable. When the reconstruction problem entails forming an image series from an incomplete or undersampled set of measurements, the process can be implemented in an iterative fashion. In such case, at each iteration, the described block processing is performed along with an operation that leverages knowledge about how the observed data set was acquired; that is, the forward system model.

A time series of images is decomposed into overlapping sub-blocks of size B×B, with each sub-block sampled T times in the time dimension. Each B×B×T sub-block is then converted to a $B^2 \times T$ matrix. Promoting low-rank structure in this matrix captures the essential structure, while removing both undersampling artifacts and noise. The processed matrices can then be converted back into overlapping sub-blocks and reassembled into a denoised image series. This technique is extendable to three-dimensional data sets sampled over time or to other types of multiple sampling situations. By way of example, for a three-dimensional reconstruction problem, B×B×B×T blocks may be worked with, which after arrangement are $B^3 \times T$. For x-ray computed tomography time series, this technique may be leveraged to significantly lower the overall radiation dose required to acquire the data.

In a singular value decomposition ("SVD") of the $B^2 \times T$ matrix, the number of non-zero singular values is the rank of the matrix. Setting singular values with very low magnitude to zero ("hard thresholding") or shrinking the singular values by some amount towards zero ("soft thresholding"), are standard denoising techniques that can be applied in this case, as well for promotion of low-rank structure. The proper threshold must be determined or estimated, however, and is related to the noise level in the image, or possibly in the sub block because the noise level can vary across the image. The threshold or set of thresholds can be estimated using established statistical routines such as generalized cross-validation (GCV) or Stein's unbiased risk estimator (SURE). In CT, where image-domain noise varies spatially, different thresholds proportional to the local noise level can be used at different spatial locations.

Without loss of generality, the reconstruction technique of the present invention will be described with respect to the specific case of time-series MRI acquired with a single-channel radiofrequency (RF) receiver. Specifically, consider a target sequence of T MR images of size N×N, and let f be an $N^2 \times T$ matrix whose columns correspond to rasterizations of the different images in this series. Additionally, let A denote a $N^2 \times T \rightarrow K \times T$ Fourier sampling operator that measures K ($K \leq N^2$) samples of each time frame. A can correspond to Cartesian or non-Cartesian sampling, may be static or vary with the second dimension, and may incorporate models of auxiliary physical phenomena. By way of example, for non-Cartesian MRI A may include a model of susceptibility-induced off-resonance effects. By way of example, A can also be structured to model the presence of multiple chemical species (e.g., Dixon-type fat+water imaging).

The observed K×T signal, g, can be expressed as:

$$g = A\{f\} + n$$

where n is zero-mean complex white Gaussian noise.

Similar and/or connected tissues tend to exhibit similar temporal dynamic. Therefore, rows of f will be be highly correlated and this matrix will be low-rank. As in compressed sensing applications, the target signal f can be estimated from the observation data g by solving an optimization problem comprising minimization of a cost functional. This cost functional will typically contain one component for promoting data fidelity, and one or more components for promoting auxiliary desired properties such as low-rankedness.

By way of example, the target signal, f, can be estimated by solving the following optimization problem:

$$f \approx \arg\min_x \{\alpha \cdot \text{rank}(x) + \|A\{x\} - g\|_F^2\}; \qquad (2)$$

where $\alpha$ is a parameter that controls the aggressiveness of low-rank promotion, and $\|\ldots\|_F$ is the Frobenius norm, which promotes data fidelity for the signal model in (1) and has the form:

$$\|x\|_F = \sqrt{\sum_{i=1}^{m} \sum_{j=1}^{n} |x_{ij}|^2}. \qquad (3)$$

For medical imaging modalities with differing noise models, the Frobenius norm term in (2) is replaced by the appropriate likelihood functional for that noise model. By way of example, in both phased-array MRI and x-ray CT, a weighted Frobenius norm term may be used.

Because the rank operator, rank ( . . . ), is non-convex, approximations of this functional such as the log-determinant functional or Schatten p-norm class (0<p<1) may be employed to facilitate practical numerical optimization. By way of example, the following convex approximation of Eqn. (2) can be adopted:

$$f \approx \arg\min_x \{\alpha \|x\|_* + \|A\{x\} - g\|_F^2\}; \qquad (4)$$

where $\|\ldots\|_*$ is the nuclear norm, which is the sum of matrix singular values and has the form:

$$\|x\|_* = \text{trace}\left(\sqrt{x^*x}\right) = \sum_{i=1}^{\min(m,n)} \sigma_i. \quad (5)$$

In sparsity-driven applications, such as compressive sensing, the $l_1$-norm is often used as a surrogate for the $l_0$-norm; using the nuclear norm as noted above is the matrix analog of this relaxation.

The maximum rank of a $N^2 \times T$ matrix is of course $\max\{N^2, T\}$. In most medical imaging scenarios, a short sequence of high resolution images is obtained, and thus $T \ll N^2$. Correspondingly, the true rank of f may not be much less than T, if at all. Since the degrees-of-freedom (DOF) of f are limited, aggressive rank minimization can result in distorted estimates of f that exhibit spatiotemporal blurring and thus limited diagnostic value.

Rather than looking at the entire image series, suppose a small B×B (B≪N) block is selected from each time frame. By way of example, for a 256×256 image an 8×8 block may be selected. As before for the full image case, the set of blocks are transformed into a Casorati matrix with dimension $B^2 \times T$. The rank of this matrix will be $\max\{B^2, T\}$; however, since B≪N, this matrix has sufficient DOF such that it will almost certainly be low-rank. In other words, migrating from a global to local scale circumvents DOF challenges and associated degradation of image reconstruction performance.

Defining $R_b$ to be a $B^2 \times N$ operator that extracts the $b^{th}$ block from the time series, the locally-low rank generalization of Eqn. (4) is:

$$f \approx \arg\min_{x}\left\{\alpha \sum_{b \in \Omega} \|R_b x\|_* + \|A\{x\} - g\|_F^2\right\}; \quad (6)$$

where $\Omega$ is the set containing the image blocks. Advantageously, this set will cover the entire image domain. Blocks contained therein may be allowed to overlap to introduce an auxiliary source of redundancy into the reconstruction process, thereby resulting in improvements in performance. By way of example, $\Omega$ may be defined to contain one $\Omega$ block for each voxel in the target spatial domain under periodic boundary conditions.

The optimization problem in (6) can be exactly or approximately solved using a number of standard numerical techniques, including but not limited to projected gradient iteration, FISTA, alternating direction method of multipliers (ADMM), and fixed-point iteration/projections-onto-convex-sets (POCS). Many popular reconstruction methods for problems of similar form to (6) employ projection or proximal mapping operators. By way of example, a proximal mapping for (6) may be defined as:

$$P_\beta(u) = \arg\min_{u}\left\{\beta \sum_{b \in \Omega} \|R_b u\|_* + \|u - y\|_F^2\right\}; \quad (7)$$

where $\beta$ is a regularization parameter that is dependent on $\alpha$. Depending on the construction of $\Omega$ (7) may be solved directly, or by an iterative method. Note that (7) closely resembles (6) except that the sampling operator A is not present. If $\Omega$ uniformly tiles the image domain, then (7) can be rewritten a $$P_\beta(u) = \arg\min_{u}\left\{\sum_{b \in \Omega}\{\beta\gamma\|R_b u\|_* + \|R_b u - R_b y\|_F^2\}\right\} \quad (8)$$

where $$\gamma = \left\|\sum_{b \in \Omega} R_b^* R_b\right\|_2.$$

Let y denote a $B^2 \times T$ matrix. The singular value decomposition ("SVD") of y factors this matrix into the product of three different matrices:

$$y = U\Sigma V^* \quad (9)$$

where U and V are $B^2 \times \min\{B^2, T\}$ and $T \times \min\{B^2, T\}$ unitary matrices, respectively, and $\Sigma$ is an $\min\{B^2, T\} \times \min\{B^2, T\}$ diagonal matrix whose diagonal elements are the singular values of y. Singular value thresholding ("SVT") of a matrix y corresponds to performing an SVD, soft-thresholding the singular values of y, and then reforming a matrix from the factorization results. Particularly:

$$z = SVT_\beta\{y\} = UH_\beta\{\Sigma\}V^* \quad (10);$$

where the soft-thresholding operator $$[H\{E\}]_{ij} = \begin{cases} \max\{\Sigma_{ij} - \beta, 0\} & i = j \\ 0 & i \neq j. \end{cases} \quad (11)$$

Correspondingly, define the block SVT operator as:

$$BSVT_\beta(y) = \gamma^{-1} \sum_{b \in \Omega} R_b^* SVT_{\beta\gamma}\{R_b y\} \quad (12)$$

In words, (12) executes an SVT operation on the Casorati matrix formed for each block in $\Omega$, and subsequently accumulates these results via weighted averaging. When $\Omega$ is comprised of spatially disjoint blocks, the closed-form expression in (9) represents an exact solution to the proximal mapping problem in (8), i.e., $P_\beta(u) = BSVT_\beta(u)$. If $\Omega$ is comprised of overlapping blocks, then (7) may not have a closed-form solution; however, the projection operator in (12) corresponds to the first iteration result of a Douglas-Rachford type operator splitting solver and therefore can be employed as $P_\beta(u) \approx BSVT_\beta(u)$. Alternatively, a complete iterative scheme can be used for (7) albeit at increased computational expense. In any case, the threshold parameter $\beta$ can be selected using a statistical method like Stein's unbiased risk estimator (SURE), as discussed earlier.

During iterative image reconstruction, defining $\Omega$ to be comprised of the set of all overlapping blocks that uniformly tile the image domain will yield translation invariance and thus strong reconstruction performance; however, this also corresponds to high computational expense. Defining $\Omega$ as set of disjoint blocks that uniformly tile the image domain will reduce computational expense (since there are fewer blocks to process) but with reduced reconstruction ability. One strategy for simultaneously obtaining the advantages of both of these setups is to define $\Omega$ as a set of disjoint blocks, and to randomly translate the spatial position of these blocks (e.g., assuming periodic boundary conditions) at each iteration of the optimization scheme.

The popular compressed sensing (CS) reconstruction strategy for accelerated MRI operates by promoting the reconstructed image(s) to be sparse, either intrinsically or in some transform domain. Sparsity and low-rankedness are inherently different measures of information, and so can be promoted simultaneously so as to provide complementary improvements in reconstruction performance. Simply, (6) can be generalized to $$f \approx \arg\min_{x} \left\{ Q(x) + \alpha \sum_{b \in \Omega} \|R_b x\|_* + \|A\{x\} - g\|_F^2 \right\} \quad (13)$$

where $Q(x)$ is a standard measure of image sparsity. By way of example, $Q(x)$ may be defined as the L1-norm of x after this signal has been wavelet transformed along its spatial dimension and Fourier transformed along its temporal dimension. Multi-penalty optimization problems like (13) can be solved using standard augmented Lagrangian strategies, such as alternating direction method of multipliers (ADMM).

In certain medical imaging applications, data acquired by the imaging system may contain more than two relevant types of dimensions. For example, modern MRI scanners often perform parallel imaging, which refers to acquiring data simultaneously with multiple receiver channels (coils). Dynamic data from such a system would have dimensions of space, time, and coil index. Similarly, modern computed tomography (CT) scanners often contain multiple x-ray sources each of which operate at a different energy level. A dynamic perfusion image series acquired on this type of "spectral" CT scanner would have dimensions space, time, and x-ray source index. In general, a data set with D dimensions can be modeled as a D-way tensor. By way of example, a 1-way tensor is a vector and a 2-way tensor is a matrix. As with matrix valued problems, tensor reconstruction is also aided by the promotion of local low-rank structure.

By way of example, for MRI acquisitions that make use of multiple receiver systems, such as parallel imaging applications, the proposed technique may be applied, as above, independently to the signal obtained from each receiver, with the set of results being combined using standard combination strategies such as sum-of-squares. However, also, the proposed technique may be applied jointly to all receiver signals at once. For the latter case, if a receiver system with C channels is employed, the target signal in (1), f, will have dimensions $N^2 \times T \times C$. Analogously, g and n will have dimensions $K \times T \times C$. Moreover, A will represent an $N^2 \times T \times C \rightarrow K \times T \times C$ sampling operator that can varying along the second (temporal) dimension but not the third (receiver channel). Additionally, the block extraction operator, $R_b$, is generalized as $N^2 \times T \times C \rightarrow B^2 \times T \times C$ such that it extracts a set of blocks from each of the receiver channel images.

Whereas f was a matrix for the single-channel time-series problem, it is viewed as a 3-way tensor for the generalized multi-channel problem. For the tensor problem, the block-wise analog of (2) is simply $$f \approx \arg\min_{x} \left\{ \alpha \sum_{b \in \Omega} \text{rank}(R_b\{x\}) + \|A\{x\} - g\|_F^2 \right\} \quad (14)$$

As with the matrix problem, direct low-rank reconstruction remains NP-hard, and approximations of (14) are used to yield an optimization problem that can be practically addressed. Moreover, tensor rank can be defined in several different ways, including the vector outer product model found in the TUCKER3 method, the core tensor model of CANDECOMP/PARAFAC, and n-rank, amongst others. By way of example, the n-rank of a tensor is defined as the vector of ranks of the different tensor matricizations or unfoldings, and a weighted average of this vector serves as an estimate of the tensor rank. For a $B^2 \times T \times C$ 3-way tensor, z, such as the one discussed above, there are three unfoldings. These matrices are denoted as $z_{(1)}$, $z_{(2)}$, and $z_{(3)}$, and have dimensions $B^2 \times TC$, $CB^2 \times T$, and $TB^2 \times C$, respectively. Adopting the n-rank construction for (14) yields $$f \approx \arg\min_{x} \left\{ \alpha \sum_{d=1}^{3} \lambda_d \sum_{b \in \Omega} \text{rank}([R_b\{x\}]_{(d)}) + \|A\{x\} - g\|_F^2 \right\} \quad (15)$$

where $\lambda$ is a vector of non-negative weights that add to unity. As before, auxiliary sparsity penalties for x can be added to (15) if desired. As before, rank minimization is NP-hard and thus surrogate models for (15) may be adopted to facilitate practical numerical implementation. By way of example, (15) can be relaxed in analog of (2)→(4) as $$f \approx \arg\min_{x} \left\{ \alpha \sum_{d=1}^{3} \lambda_d \sum_{b \in \Omega} \|[R_b\{x\}]_{(d)}\|_* + \|A\{x\} - g\|_F^2 \right\} \quad (16)$$

Of course, auxiliary sparsity-promoting terms can also be incorporated into (16) in a manner analogous to (13). (16) can also be attacked numerically using standard techniques for multi-penalty regression. By way of example, (16) can be minimized using alternating direction method of multipliers (ADMM) or using an averaged approximate projection technique.

When C=1 and $$\lambda = \begin{bmatrix} \frac{1}{2} & \frac{1}{2} & 0 \end{bmatrix} \quad (15)$$

resorts exactly to (6). Conversely, if T=1 and $$\lambda = \begin{bmatrix} \frac{1}{2} & 0 & \frac{1}{2} \end{bmatrix},$$

then (16) yields the CLEAR method for calibrationless parallel MRI that was previously introduced by the authors. Moreover, letting $\lambda = [0 \ 1 \ 0]$ defines a direct generalization of (6) for multi-channel data that simultaneously exploits spatiotemporal image series redundancies across the different receiver channels. In effect, data from the different receiver channels are "stacked" column-wise, and local low-rank regression proceeds as it would for the standard matrix case. There are, of course, infinitely-many other ways to define the weighting vector, $\lambda$. Overall, (16) provides a natural generalization of the local low-rank method for multi-channel data as well as means for unifying the methods of this work with the authors' previous work on calibrationless parallel MRI.

Referring now to FIG. 1, a flowchart setting forth the steps of an example of a method for reconstructing a dynamic series of images by promoting locally low-rank structure during image reconstruction is illustrated. The method begins with the acquisition of image data, as indicated at step 102. For example, image data may be acquired with a magnetic resonance imaging ("MRI") system as a time series of image frames depicting a region in a subject. Alternately, image data may be acquired with an x-ray computed tomography ("CT") system as a time series of image frames depicting a region in a subject. It will be appreciated that other imaging systems may also be implemented to acquire image data as a time series of image frames, such systems including positron emission tomography ("PET") systems, single photon emission computed tomography ("SPECT") systems, ultrasound systems, or the like. Regarding data acquisition, as with compressed sensing applications, rank-based methods experience improvements when the sampling operator relied upon exhibits an incoherent point spread function. Thus, by way of example, incoherent sampling, such as that achieved using a two-dimensional variable density random sampling, may be used during data acquisition.

A set of image blocks, $\Omega$, is chosen, as indicated at step 104. By way of example, the set of image blocks contains the location and size of a plurality of B×B image blocks distributed in the image domain. For example, the set of image blocks may include a B×B sized image block centered at each voxel location in the image domain. Advantageously, the image blocks may overlap in the image domain. As an example, B may be selected as B=8. Multiple block sizes may also be simultaneously employed, in which case each of the multiple blocks corresponds to a different B. Doing so improves the multiscale adaptivity of the proposed method. By way of example, three different block sets may be simultaneously employed, where each different block set corresponds to B=2,4,8. Additionally, the relative importance of the different sets can be dictated by utilizing a different regularization parameter for each scale. Using the acquired image data and the chosen image block set, an image estimate is reconstructed by minimizing an objective function that promotes locally-low rank structure in the reconstructed coil images, as indicated at step 106, and as described above in detail.

When the data is fully sampled, that is, when the sampling operator A is the identity operator, locally low-rank reconstruction acts to provide significant denoising capability. Correspondingly, image series denoising can be considered as a special case of the more general reconstruction problem, which also includes the recovery of image series from incomplete measurement sets. In this situation, the mathematical problems in Eqns. (6) and (7) are equivalent; thus, denoising may realized via a single execution of the (exact or approximate) projection operator in Eqn. (12), which is simple and efficient. This technique may be particularly applicable to reducing radiation dose in time-series CT applications, such as perfusion imaging.

Figure 2:
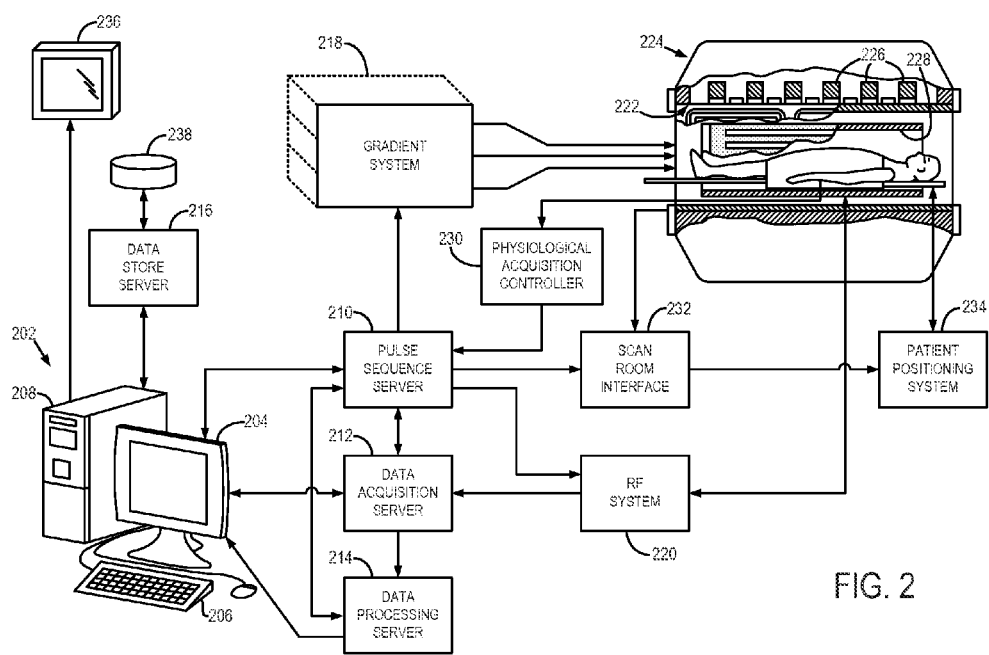
FIG. 2 is a block diagram of an example of a magnetic resonance imaging ("MRI") system.

Referring particularly now to FIG. 2, an example of a magnetic resonance imaging ("MRI") system 200 is illustrated. The MRI system 200 includes a workstation 202 having a display 204 and a keyboard 206. The workstation 202 includes a processor 208, such as a commercially available programmable machine running a commercially available operating system. The workstation 202 provides the operator interface that enables scan prescriptions to be entered into the MRI system 200. The workstation 202 is coupled to four servers: a pulse sequence server 210; a data acquisition server 212; a data processing server 214; and a data store server 216. The workstation 202 and each server 210, 212, 214, and 216 are connected to communicate with each other.

The pulse sequence server 210 functions in response to instructions downloaded from the workstation 202 to operate a gradient system 218 and a radiofrequency ("RF") system 220. Gradient waveforms necessary to perform the prescribed scan are produced and applied to the gradient system 218, which excites gradient coils in an assembly 222 to produce the magnetic field gradients $G_x$, $G_y$, and $G_z$ used for position encoding MR signals. The gradient coil assembly 222 forms part of a magnet assembly 224 that includes a polarizing magnet 226 and a whole-body RF coil 228.

RF excitation waveforms are applied to the RF coil 228, or a separate local coil (not shown in FIG. 2), by the RF system 220 to perform the prescribed magnetic resonance pulse sequence. Responsive MR signals detected by the RF coil 228, or a separate local coil (not shown in FIG. 2), are received by the RF system 220, amplified, demodulated, filtered, and digitized under direction of commands produced by the pulse sequence server 210. The RF system 220 includes an RF transmitter for producing a wide variety of RF pulses used in MR pulse sequences. The RF transmitter is responsive to the scan prescription and direction from the pulse sequence server 210 to produce RF pulses of the desired frequency, phase, and pulse amplitude waveform. The generated RF pulses may be applied to the whole body RF coil 228 or to one or more local coils or coil arrays (not shown in FIG. 2).

The RF system 220 also includes one or more RF receiver channels. Each RF receiver channel includes an RF amplifier that amplifies the MR signal received by the coil 228 to which it is connected, and a detector that detects and digitizes the I and Q quadrature components of the received MR signal. The magnitude of the received MR signal may thus be determined at any sampled point by the square root of the sum of the squares of the I and Q components:

$$M=\sqrt{I^2+Q^2} \qquad (17);$$

and the phase of the received MR signal may also be determined:

$$\varphi = tan^{-1}\left(\frac{Q}{I}\right). \qquad (18)$$

The pulse sequence server 210 also optionally receives patient data from a physiological acquisition controller 230. The controller 230 receives signals from a number of different sensors connected to the patient, such as electrocardiograph ("ECG") signals from electrodes, or respiratory signals from a bellows or other respiratory monitoring device. Such signals are typically used by the pulse sequence server 210 to synchronize, or "gate," the performance of the scan with the subject's heart beat or respiration.

The pulse sequence server 210 also connects to a scan room interface circuit 232 that receives signals from various sensors associated with the condition of the patient and the magnet system. It is also through the scan room interface circuit 232 that a patient positioning system 234 receives commands to move the patient to desired positions during the scan.

The digitized MR signal samples produced by the RF system 220 are received by the data acquisition server 212. The data acquisition server 212 operates in response to instructions downloaded from the workstation 202 to receive the real-time MR data and provide buffer storage, such that no data is lost by data overrun. In some scans, the data acquisition server 212 does little more than pass the acquired MR data to the data processor server 214. However, in scans that require information derived from acquired MR data to control the further performance of the scan, the data acquisition server 212 is programmed to produce such information and convey it to the pulse sequence server 210. For example, during prescans, MR data is acquired and used to calibrate the pulse sequence performed by the pulse sequence server 210. Also, navigator signals may be acquired during a scan and used to adjust the operating parameters of the RF system 220 or the gradient system 218, or to control the view order in which k-space is sampled. The data acquisition server 212 may also be employed to process MR signals used to detect the arrival of contrast agent in a magnetic resonance angiography ("MRA") scan. In all these examples, the data acquisition server 212 acquires MR data and processes it in real-time to produce information that is used to control the scan.

The data processing server 214 receives MR data from the data acquisition server 212 and processes it in accordance with instructions downloaded from the workstation 202. Such processing may include, for example: Fourier transformation of raw k-space MR data to produce two or three-dimensional images; the application of filters to a reconstructed image; the performance of a backprojection image reconstruction of acquired MR data; the generation of functional MR images; and the calculation of motion or flow images.

Images reconstructed by the data processing server 214 are conveyed back to the workstation 202 where they are stored. Real-time images are stored in a data base memory cache (not shown in FIG. 2), from which they may be output to operator display 212 or a display 236 that is located near the magnet assembly 224 for use by attending physicians. Batch mode images or selected real time images are stored in a host database on disc storage 238. When such images have been reconstructed and transferred to storage, the data processing server 214 notifies the data store server 216 on the workstation 202. The workstation 202 may be used by an operator to archive the images, produce films, or send the images via a network to other facilities.

The above-described, local low-rank promotion technique can be readily compared against global low-rank promotion techniques, for example, when considering dynamic MRI studies. It has been shown that dynamic MRI series reconstructions can be significantly improved by promoting low-rank (LLR) structure in the estimated image series when it is reshaped into Casorati form (N×N×T series→$N^2$×T matrix). When T<<$N^2$, the rank of the (reshaped) true underlying image may actually be not much less than T. For such cases, aggressive rank reduction will result in temporal blurring while only modest rank reduction will fail to remove noise. Some have proposed a (rank-preserving) spectral filtering technique for multi-echo MRI that operates on overlapping image subregions. However, instead, a restriction to only local operations can potentially overcome some of the challenges faced by LR promoting methods when the row and column dimensions of the Casorati matrix differ significantly.

The above-described local LR promoting image series reconstruction paradigm, which will be referred to hereafter a locally low rank (LLR) image recovery, spatially decomposes an image series estimate into a (redundant) collection of overlapping blocks and promotes that each block, when put into Casorati form, be independently LR. For this comparison and without the loss of generality, only the recovery of fully-sampled but noisy dynamic series will be considered here. Let u be the $N^2$×T Casorati matrix formed from a series of T images of size N×N. Recall the rank-constrained estimation problem described above with respect to equation (2) can be described in this example as:

$$u = \arg\min\{\tau \cdot \text{rank}(u) + \|u-g\|_F^2\} \quad (19);$$

where g is the observed (noisy) dynamic series, and τ is a regularization parameter. As a generalization of equation (1), for example, for undersampled reconstruction, are often intractable, a convex relaxation of equation (1) can be considered that has also been proven to promote low-rank solutions:

$$u = \arg\min\{\tau\|u\|_* + \|u-g\|_F^2\} \quad (20);$$

where, for some m×n matrix X with singular values, σ, the nuclear norm is defined as:

$$\|X\|_* = \sum_{i=1}^{\min(m,n)} \sigma_i. \quad (21)$$

Following the above discussion, the following localized generalization can be made:

$$u = \arg\min \tau \sum_{b \in \Omega} \|R_b u\|_* + \|u - g\|_2^2; \quad (22)$$

where the operator $R_b$ extract the $b^{th}$ B×B×T block from the set Ω. Define X=$R_b$u and Y=$R_b$g, and let SVD(Y)=UΣV* and $\sigma_i = [\Sigma]_{(i,i)}$. Each image block can be reconstructed independently by singular value thresholding (SVT), namely X=SVT(Y)=U$\Sigma_+$V*, where the diagonal matrix $[\Sigma_+]_{(i,i)}$=max($\sigma_i$-τ,0). Following recovery and reformation into their nominal dimensions, blocks can be accumulated (via weighted average) to form the resulting image estimate. The threshold parameter can be estimated using standard statistical methods like Stein's unbiased risk estimator (SURE).

By way of example, a comparison can be made of the LLR technique against the global low-rank promotion with respect to a 160×160×20 long axis gated cardiac exam acquired on a GE 1.5T Signa Scanner (v.14.0) using a FIESTA sequence (FA=50 degree, TR/TE=2.8 ms/1.2 ms) and an 8 channel upper body coil. Noise standard deviation was estimated as ε=10. For the LLR reconstruction, B=8 was used and Ω was the set of all overlapping blocks in the image space (|Ω|=23409). For the global LR recovery, B=160 was used (|Ω|=1). Each coil image was reconstructed independently and subsequently combined via sum-of-squares. Reconstruction SNR was estimated using ROIs in the left ventricle and in the ex-vivo background, and were 8.71, 16.14, and 42.46 for the raw data, global LR reconstruction, and LLR reconstruction, respectively.

Upon doing so, it was observed that, in dominantly static image regions, both the global and proposed local reconstructions managed to preserve small, low-contrast objects such as secondary pulmonary vessel branches as well as improve their conspicuity. However, the LLR reconstruction proved to both remove a higher degree of noise and maintain greater fidelity to the original image series that did the standard approach. These trends are obviated in the both difference (between the raw and reconstruction) images in (g-h) as well as the single frame zoom images in (b,d,f).

Thus, tests established that local low-rank promoting image reconstruction paradigm of the present invention, when used for dynamic image series, simultaneously offers improved noise suppression and reduced information loss. The application of the local low-rank promoting image reconstruction paradigm of the present invention to the problem of undersampled reconstruction is similarly proven. Further still, the local low-rank promoting image reconstruction paradigm of the present invention can also incorporate spatial sparsity constraints.

Figure 3A:
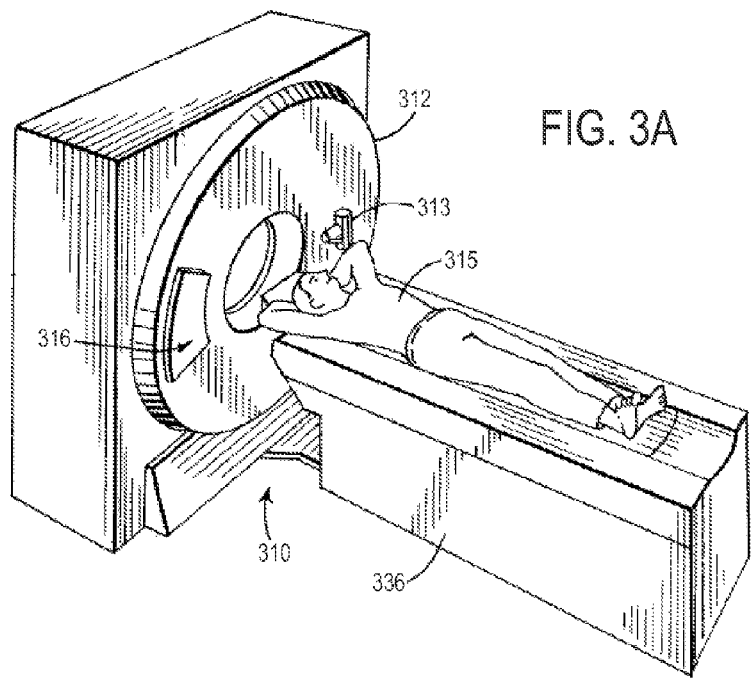
FIG. 3A is a CT imaging system in which the present invention may be employed.
Figure 3B:
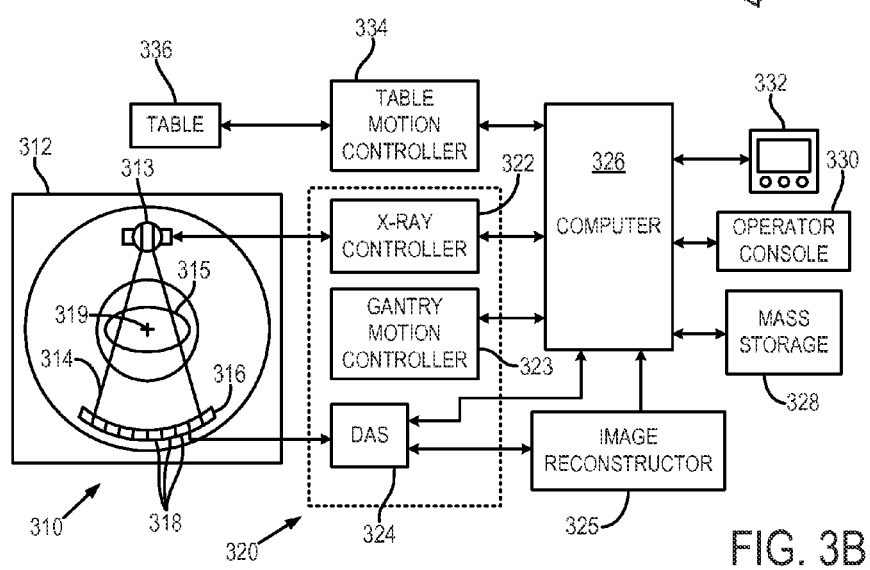
FIG. 3B is block schematic diagram of the CT imaging system of FIG. 3A.

As described above, the present invention can be readily applied in the context of other imaging modalities. For example, referring now to FIGS. 3A and 3B, a computed tomography (CT) imaging system 310 includes a gantry 312 having a pair of x-ray sources 313 that each project a fan beam or cone beam of x-rays 314 toward a detector array 316 on the opposite side of the gantry 312. The detector array 316 is formed by a number of detector elements 318 that together sense the projected x-rays that pass through a medical patient 315. During a scan to acquire x-ray projection data, the gantry 312 and the components mounted thereon rotate about a center of rotation 319 located within the patient 315 to acquire attenuation data.

The rotation of the gantry 312 and the operation of the x-ray source 313 are governed by a control mechanism 320 of the CT system 310. The control mechanism 320 includes an x-ray controller 322 that provides power and timing signals to the x-ray sources 313 and a gantry motor controller 323 that controls the rotational speed and position of the gantry 312. A data acquisition system (DAS) 324 in the control mechanism 320 samples analog data from detector elements 318 and converts the data to digital signals for subsequent processing. An image reconstructor 325, receives sampled and digitized x-ray data from the DAS 324 and performs high speed image reconstruction. The reconstructed image is applied as an input to a computer 326 that stores the image in a mass storage device 328.

The computer 326 also receives commands and scanning parameters from an operator via console 330 that has a keyboard. An associated display 332 allows the operator to observe the reconstructed image and other data from the computer 326. The operator supplied commands and parameters are used by the computer 326 to provide control signals and information to the DAS 324, the x-ray controller 322, and the gantry motor controller 323. In addition, computer 326 operates a table motor controller 334 that controls a motorized table 336 to position the patient 315 in the gantry 312.

Figure 4:
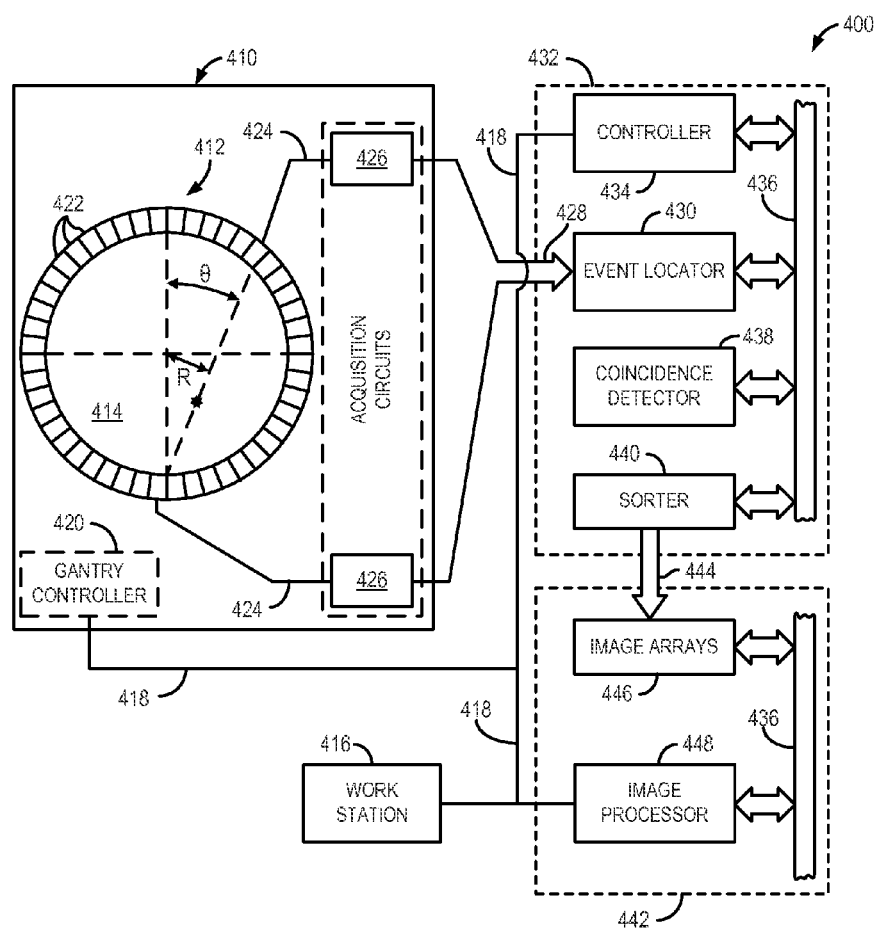
FIG. 4 is a schematic view of a positron emission tomography (PET) system that can be operated in accordance with the present invention.
Figure 5:
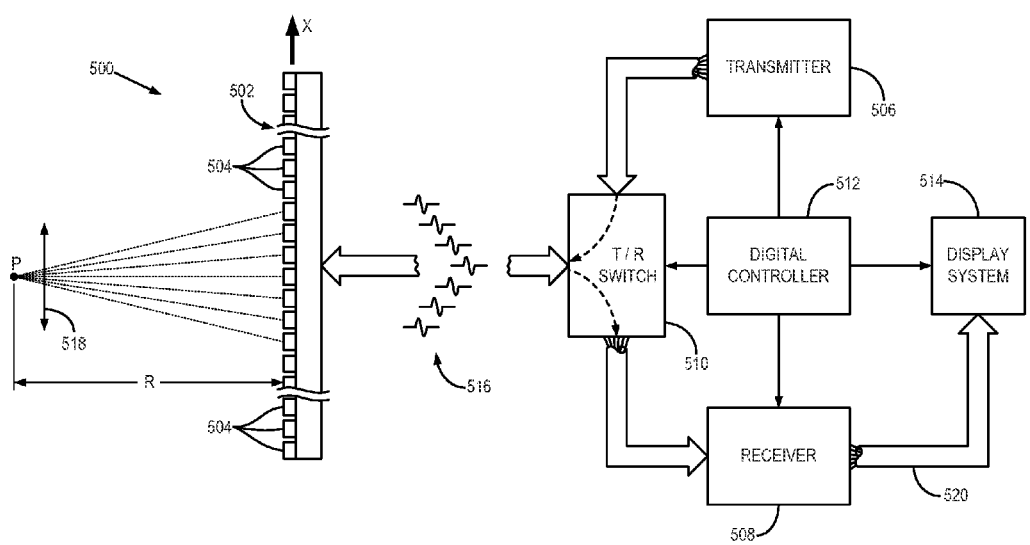
FIG. 5 is a block diagram of an ultrasound system that can be operated in accordance with the present invention.

Referring now to FIG. 4, the above-described techniques can also readily apply to other tomographic systems, such as a positron emission tomography (PET) system 400. The PET system 400 includes an imaging hardware system 410 that includes a detector ring assembly 412 about a central axis, or bore 414. An operator work station 416 communicates through a communications link 418 with a gantry controller 420 to control operation of the imaging hardware system 410.

The detector ring assembly 412 is formed of a multitude of radiation block detector units 422. Each radiation block detector unit 422 includes a set of scintillator crystals that is disposed in front of an array of photomultiplier tubes or a position-sensitive photomultiplier tube (not shown). Each photomultiplier tube produces a signal responsive to detection of a photon on communications line 424 when a scintillation event occurs. A set of acquisition circuits 426 receive the signals and produce signals indicating the event coordinates (x, y) and the total energy associated with the photons that caused the scintillation event. These signals are sent through a cable 428 to an event locator circuit 430. Each acquisition circuit 426 also obtains information from the detector's signals that indicates the exact moment the scintillation event took place. For example, sophisticated digital electronics can obtain this information regarding the precise instant in which the scintillations occurred from the samples of the signals used to obtain energy and event coordinates.

The event locator circuits 430 in some implementations, form part of a data acquisition processing system 432 that processes the signals produced by the acquisition circuits 426. The data acquisition processing system 432 usually includes a general controller 434 that controls communications for example, by way of a backplane bus 436, and on the general communications network 418. The event locator circuits 430 assemble the information regarding each valid event into a set of numbers that indicate precisely when the event took place, the position in which the event was detected and the energy deposited by the photon. This event data packet is conveyed to a coincidence detector 438 that is also part of the data acquisition processing system 432.

The coincidence detector 438 accepts the event data packets from the event locator circuit 430 and determines if any two of them are in coincidence. Coincidence is determined by a number of factors. First, the energy associated with each event data packet must fall within a predefined energy acceptance window, such as around 511 keV±ΔE (where ΔE is a function of the energy resolution of the block detectors). Second, the time markers in each event data packet must be within a predetermined time window, for example, 5 nanoseconds or even down to picoseconds. Third, the locations indicated by the two event data packets must lie on a general straight line that passes through the field of view in the scanner bore 414. Coincidence events are assembled into imaging data packets and then reconstructed into images using image reconstruction techniques, such as described above in accordance with the present invention.

In addition the present invention can be used with an ultrasound system 500. The ultrasound imaging system 500 includes a transducer array 502 that includes a plurality of separately driven transducer elements 504. When energized by a transmitter 506, each transducer element 502 produces a burst of ultrasonic energy. The ultrasonic energy reflected back to the transducer array 502 from the object or subject under study is converted to an electrical signal by each transducer element 504 and applied separately to a receiver 508 through a set of switches 510. The transmitter 506, receiver 508, and switches 510 are operated under the control of a digital controller 512 responsive to the commands input by a human operator. A complete scan is performed by acquiring a series of echo signals in which the switches 510 are set to their transmit position, thereby directing the transmitter 506 to be turned on momentarily to energize each transducer element 504. The switches 510 are then set to their receive position and the subsequent echo signals produced by each transducer element 504 are measured and applied to the receiver 508. The separate echo signals from each transducer element 504 are combined in the receiver 508 to produce a single echo signal that is employed to produce a line in an image, for example, on a display system 514.

The transmitter 506 drives the transducer array 502 such that an ultrasonic beam is produced, and which is directed substantially perpendicular to the front surface of the transducer array 502. To focus this ultrasonic beam at a range, R, from the transducer array 502, a subgroup of the transducer elements 504 are energized to produce the ultrasonic beam and the pulsing of the inner transducer elements 504 in this subgroup are delayed relative to the outer transducer elements 504, as shown at 516. An ultrasonic beam focused at a point, P, results from the interference of the separate wavelets produced by the subgroup of transducer elements 504. The time delays determine the depth of focus, or range, R, which is typically changed during a scan when a two-dimensional image is to be performed. The same time delay pattern is used when receiving the echo signals, resulting in dynamic focusing of the echo signals received by the subgroup of transducer elements 504.

To generate the next scan line, the subgroup of transducer elements 504 to be energized are shifted one transducer element 504 position along the length of the transducer array 502 and another scan line is acquired. As indicated at 518, the focal point, P, of the ultrasonic beam is thereby shifted along the length of the transducer 502 by repeatedly shifting the location of the energized subgroup of transducer elements 504.

The present invention has been described in terms of one or more preferred embodiments, and it should be appreciated that many equivalents, alternatives, variations, and modifications, aside from those expressly stated, are possible and within the scope of the invention.

The invention claimed is:

1. A medical imaging system comprising:
    a system for collecting image domain data from a subject over a time period to assemble time series image domain data;
    a processor configured to reconstruct the time series image domain data into a time series of images of the subject over the time period by:
        selecting a set of image blocks that defines a location and size of each of a plurality of image blocks in the time series image domain data;
        jointly estimating each of a plurality of images that form the time series of images of the subject using the time series image domain data and the set of image blocks; and
    promoting locally-low rank structure in the jointly estimated plurality of images using the set of image blocks which spatially decomposes an image series estimate into a collection of blocks each containing information from more than one image in the time series of images.

2. The system of claim 1 wherein the processor is further configured to minimize an objective function while promoting the locally-low rank structure in the jointly estimated plurality of images using the set of image blocks.

3. A medical imaging system comprising:
    a system for collecting image domain data from a subject over a time period to assemble time series image domain data;
    a processor configured to reconstruct the time series image domain data into a time series of images of the subject over the time period by:
        selecting a set of image blocks that defines a location and size of each of a plurality of image blocks in the time series image domain data; and
        jointly estimating each of a plurality of images that form the time series of images of the subject using the time series image domain data and the set of image blocks;
    wherein the processor is further configured to minimize an objective function while promoting locally-low rank structure in the jointly estimated plurality of images using the set of image blocks; and
    wherein the processor is further configured to cause the locally low-rank structure in the plurality of images to be promoted by imposing a penalty factor that penalizes the set of image blocks selected in step b) for not being locally low-ranked.

4. The system of claim 3 wherein the processor is further configured to calculate a penalty factor by calculating a nuclear norm of each image block defined by the set of images blocks selected in step b) and sum the calculated nuclear norms.

5. The system of claim 3 wherein the processor is further configured to apply the penalty factor by calculating a singular value soft threshold for each image block in the set of image blocks.

6. The system of claim 1 further comprising a display configured to display the time series of images of the subject.

7. The system of claim 1 wherein the medical imaging system forms at least one of a magnetic resonance imaging (MRI) system, a computed tomography (CT) system, a single photon emission computed tomography (SPECT) imaging system, a positron emission tomography (PET) imaging system, and an ultrasound system.

8. A method for producing a time series of images from data acquired with a medical imaging system, the steps of the method comprising:
    a) acquiring data from a subject with a medical imaging system during a period of time;
    b) selecting a set of image blocks that defines a location and size of each of a plurality of image blocks in an image domain;
    c) jointly estimating each of a plurality of images that form a time series of images using the data acquired in step a) and the set of image blocks selected in step b);
    d) displaying the time series of images; and
    in which the joint estimation performed in step c) includes minimizing an objective function while promoting locally-low rank structure in the jointly estimated plurality of images using the set of image blocks selected in step b), which spatially decomposes an image series estimate into a collection of blocks from multiple portions of the period of time.

9. A method for producing a time series of images from data acquired with a medical imaging system, the steps of the method comprising:
    a) acquiring data from a subject with a medical imaging system during a period of time;
    b) selecting a set of image blocks that defines a location and size of each of a plurality of image blocks in an image domain;
    c) jointly estimating each of a plurality of images that form a time series of images using the data acquired in step a) and the set of image blocks selected in step b);
    d) displaying the time series of images;
    in which the joint estimation performed in step c) includes minimizing an objective function while promoting locally-low rank structure in the jointly estimated plurality of images using the set of image blocks selected in step b); and
    in which a locally-low rank structure in the jointly estimated plurality of images is promoted by imposing a penalty factor that penalizes the set of image blocks selected in step b) for not being locally low-rank.

10. The method as recited in claim 9 in which the penalty factor includes calculating a singular value soft threshold for each image block in the set of image blocks selected in step b).

11. The method as recited in claim 9 in which the penalty factor includes calculating a nuclear norm of each image block defined by the set of images blocks selected in step b) and summing the calculated nuclear norms.

12. The method as recited in claim 9 in which non-convex surrogates for the rank functional are employed as the penalty factor.

13. The method as recited in claim 8 in which the selected set of image blocks includes image blocks that are all similarly sized.

14. The method as recited in claim 8 in which the selected set of image blocks includes image blocks that are not all similarly sized.

15. The method as recited in claim 8 in which step c) includes jointly denoising the time series of image frames.

16. The method as recited in claim 8 in which the spatial position of the set of image blocks is shifted during an step c).

17. The method as recited in claim 8 in which sparsity is promoted in conjunction with promotion of local low-rankedness.

18. The method as recited in claim 8 in which the medical imaging system is at least one of a magnetic resonance imaging (MRI) system, an x-ray computed tomography (CT) imaging system, a single photon emission computed tomography (SPECT) imaging system, a positron emission tomography (PET) imaging system, and an ultrasound system.

19. The method as recited in claim 8 in which the medical imaging system is an MRI system and the data acquired in step a) is acquired using a plurality of receiver coil elements.

20. The method as recited in claim 8 in which the medical imaging system is an MRI system and the data acquired in step a) is sampled using one of a random, non-uniform, and incoherent sampling pattern.

21. The method as recited in claim 8 in which the medical imaging system is an MRI system and the data acquired in step a) is acquired on a non-Cartesian grid.

22. The method as recited in claim 8 in which the medical imaging system is an MRI system and step c) includes accounting for MRI physical phenomena including at least one of non-Cartesian sampling, chemical shift, and susceptibility-induced off-resonance.

23. The method as recited in claim 8 in which the medical imaging system is an x-ray CT system and the data acquired in step a) is obtained with x-ray sources operating at substandard energy levels to reduce patient radiation dose.

24. The method as recited in claim 8 in which the medical imaging system is an x-ray CT system and the data acquired in step a) corresponds to a reduced set of angular projections.

25. The method as recited in claim 8 in which the medical imaging system is an x-ray CT system and c) includes employing different threshold values at different spatial locations.

26. The method as recited in claim 8 in which the data acquired in step a) contains a plurality of auxiliary dimensions beyond at least one of i) space and time and ii) space and acquisition parameter index.

27. The method as recited in claim 26 in which the plurality of image series with D ambient dimensions are jointly considered as a D-way tensor and for processing according to steps b) through d).

28. The method as recited in claim 8 in which at least one of steps b) and c) include determine a tensor rank using a product factorization including at least one of a TUCKER3 method and a CANDECOMP/PARAFAC method.

29. The method as recited in claim 8 in which at least one of steps b) and c) include determine a tensor rank using a weighted sum of tensor n-rank vector.

* * * * *